Sept. 8, 1953 W. PALMER 2,651,771
ANGULAR MOTION DETECTOR AND POSITION INDICATOR
Filed Oct. 14, 1949 2 Sheets-Sheet 2

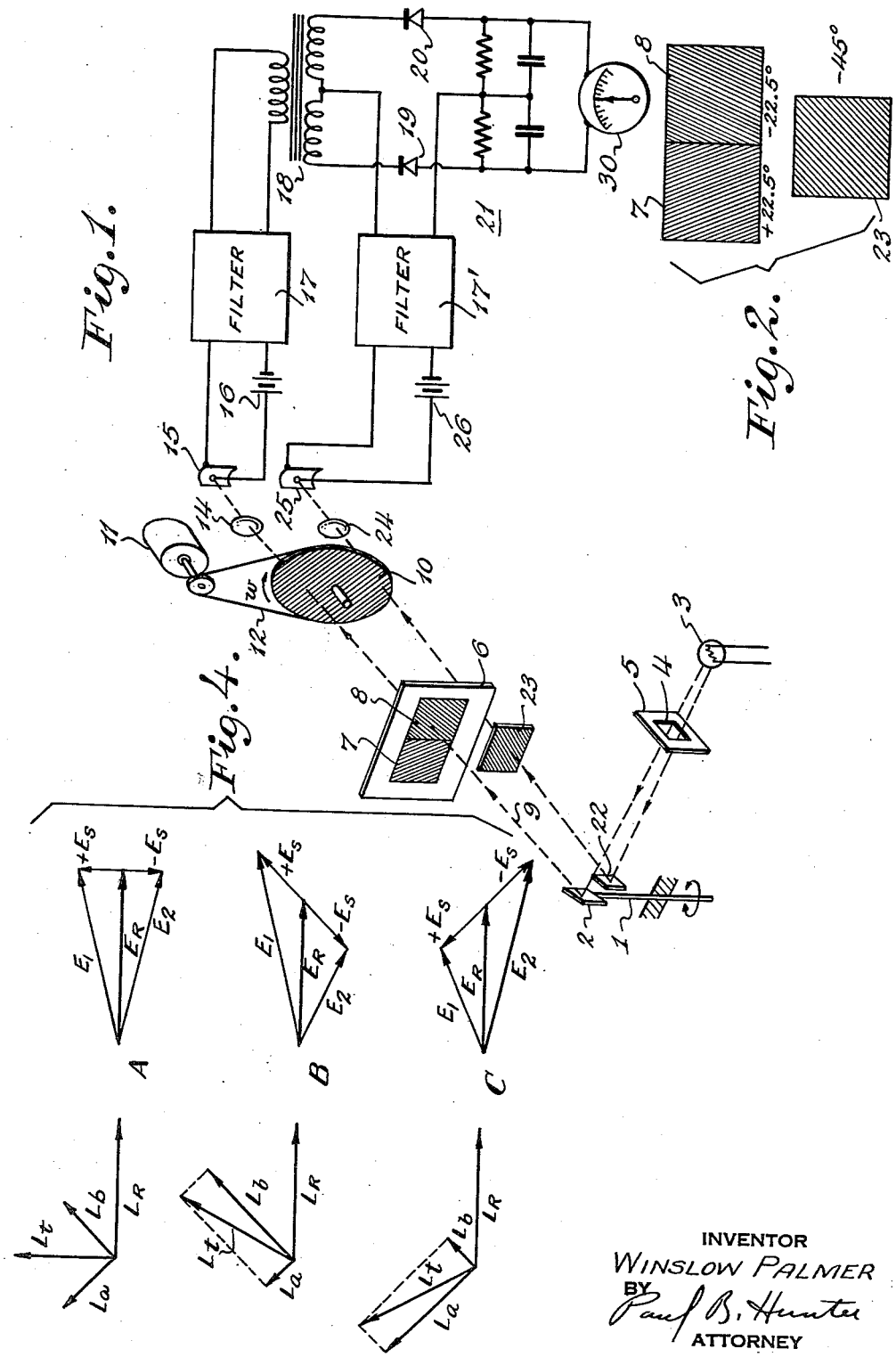

INVENTOR
WINSLOW PALMER
BY Paul B. Hunter
ATTORNEY

Patented Sept. 8, 1953

2,651,771

UNITED STATES PATENT OFFICE 2,651,771

ANGULAR MOTION DETECTOR AND POSITION INDICATOR

Winslow Palmer, West Hempstead, N. Y., assignor to The Sperry Corporation, a corporation of Delaware Application October 14, 1949, Serial No. 121,367

14 Claims. (Cl. 340—190)

This invention relates generally to angular motion detectors and angular position indicators and the invention has reference more particularly to a novel angular motion detector and indicator wherein a non-torsional photoelectric pickoff is employed.

The invention is particularly valuable wherein it is desirable to indicate, locally or at a distance, the angular position or movement of delicate members such as instruments having moving hands; for example, compasses, voltmeters, barometers, etc., which instruments cannot exert torsional force, and hence in order to indicate the angular position of such instruments, a system wherein there is no actual contact between the pickoff and the instrument itself, is essential. Heretofore, photoelectric pickoffs have been employed which indicate angular position or deviation, but these systems are generally open to the objection that changes in photo-cell sensitivity result in changes in the null position of the indicator, thereby causing errors which are variable with time.

One object of the present invention is therefore to produce a novel angular motion detector and angular position indicator suitable for accurately indicating the angular position of a member without requiring such member to exert any torque.

Another object of the present invention is to provide a novel photoelectric pickoff from an angularly movable member wherein the zero or null condition of the angular indication is independent of photoelectric sensitivity.

Another object of the present invention is to provide a novel angular position indicator and motion detector employing fixed and movable polarizing devices in connection with a light source and a photoelectric cell for effecting the modulation of a beam of light such that the phase of the modulation varies with the motion to be detected and indicated, whereby a phase detector may be used for indicating angular position.

Other objects and advantages will become apparent when taken in connection with the drawings of which:

Fig. 1 is a schematic view of one form of the novel angular motion detector and position indicator of this invention;

Fig. 2 is an enlarged detailed diagram of a portion of the structure of Fig. 1;

Fig. 4 are vector diagrams illustrating the operation of the system of Fig. 1;

Figure 5:
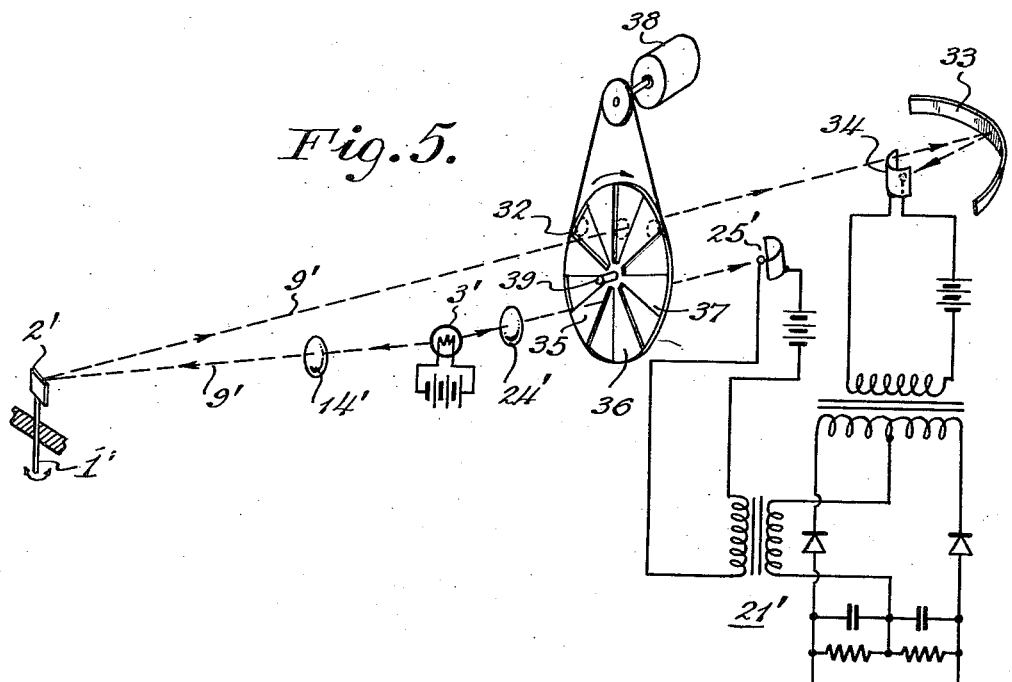
Fig. 5 is a schematic view of a somewhat modified construction.

Referring now more particularly to Fig. 1, reference numeral 1 designates the angularly movable member such as the shaft of a delicate instrument whose angular motion and position with respect to a desired or null point is to be indicated, as for example, at a distance. The shaft 1 is shown carrying a reflector or mirror 2 upon which a beam of light falls from a light source 3, passing through an orifice 4 in a mask 5. Light from source 3, as reflected from mirror 2, falls upon a mask 6 carrying polarizing devices 7 and 8 that are disposed 45° apart and arranged side by side. Thus in Fig. 2, these polarizing devices 7 and 8 are shown in detail and assuming the vertical line is zero degrees, one polarizing device is turned at 22½° therefrom in a positive direction while the other is 22½° therefrom in a negative direction so that the planes of polarization of these polarizing devices are 45° apart. Light reflected from mirror 2 shown by the line 9 is in the form of a beam and is adapted to fall upon the polarizing devices 7 and 8 and passing therethrough falls upon a rotating disc polarizing device 10. This disc polarizing device is driven from a constant speed motor 11 by means of a belt 12 although other means for rotating this disc may be used.

Beyond the disc 10 there is a focussing lens 14 for concentrating the light from either polarizing device 7 or 8 or both after passage through the disc 10 upon a photo-cell 15 which is shown suitably energized by a battery 16. The photo-cell 15 circuit includes a filter 17 that extracts the fundamental components of the photo-cell output; that is, the output having the frequency equal to that of twice the rotational frequency of the modulating polarizing disc 10 so that the output of filter 17 is essentially purely sinusoidal waves, which waves are applied to a primary of a transformer 18, whose secondary has two terminals respectively connected to rectifiers 19 and 20 constituting elements of a phase detector 21.

The phase detector 21 is operated with a reference voltage which is derived from the light source 3 as follows: light from this source, after passing through the aperture 4 also falls upon a fixed mirror 22 and is reflected from the fixed mirror 22 upon a fixed polarizing device 23 which is shown with its plane of polarization 45° from midway between the polarizing devices 7 and 8. This is particularly shown in Fig. 2. After passing through the polarizing device 23, this light source falls upon the rotating polarizing device 10 and from thence it passes through a converging lens 24 to a photo-cell 25 suitably energized by a battery 26.

The circuit for photo-cell 25 includes a filter 17' like filter 17 for extracting the fundamental component of the photo-cell output, i. e., twice the rotational frequency of the modulating polarizing disc 10 and the resulting substantially pure sinusoidal wave is applied through the secondary of the transformer 18 similarly to the rectifiers 19 and 20 of the phase detector 21.

Figure 3:
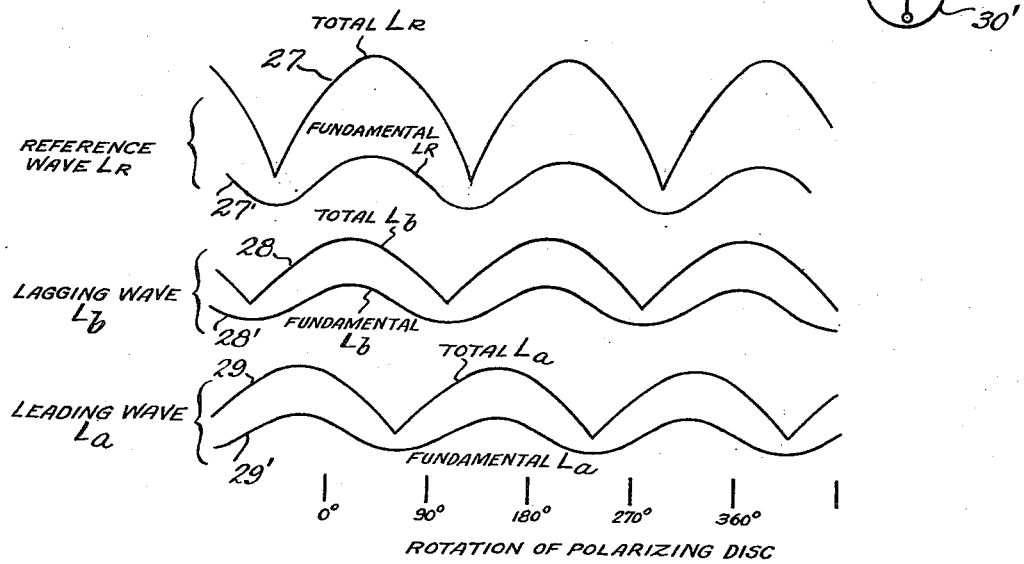
Fig. 3 is a diagram illustrating the modulated total light and derived fundamental components of the light beams and resulting photo-cell outputs.

Referring now to Fig. 3, curve 27 represents the modulated total light of the reference from $L_R$ and the corresponding voltage wave output of the photo-cell 25 due to the reference light beam passing through polarizing devices 23 and 10. From this reference voltage wave, the filter 17' extracts the fundamental wave 27' of twice the frequency of rotation of the rotating disc 10, which wave 27' is substantially sinusoidal and is applied through the transformer 18 in like fashion to the rectifiers 19 and 20. Curve 28 represents the lagging modulated total light wave passing through polarizing devices 8 and 10 which may be designated $L_b$. This lagging light wave after falling upon photo-cell 15 produces a voltage output as shown by curve 28, the filter 17 serving to extract the fundamental voltage wave shown by curve 28'.

Similarly light beam 9 in passing through leading polarizing device 7 and rotating polarizing device 10 and upon photo-cell 15 causes this photo-cell to produce a leading voltage wave designated by the curve 29 in Fig. 3A from which the fundamental is selected by filter 17 so that the sinusoidal wave 29' is supplied to the input of phase comparator 21. Thus it will be seen that the signal applied through the transformer 18 from filter 17 is made up of two sine waves, assuming that light beam 9 is passing through both of the polarizing devices 7 and 8, whose amplitudes vary with the position of the signal beam 9 and whose phase, i. e. the phase of 28' and 29' of Fig. 3 are 90° apart so that the resultant voltage will shift in phase as the beam moves from one polarizing device to the other.

This result is indicated further in Fig. 4 wherein in the vector diagram shown, the first column of vectors represents the fundamental components of the light beams and the second column of vectors represents the electric waves as applied to the phase detector. $L_a$ and $L_b$ are vectors representing the modulation of the light beam passing through the polarizing devices 7 and 8 and $L_R$ is a vector representing the reference light beam passing through the reference polarizing device 23. $L_t$ is the resultant of $L_a$ and $L_b$ and is indicative of the total light applied to photo-cell 15. Diagram A of Fig. 4 shows $L_t$ of such value as obtains when $L_a$ and $L_b$ are equal, i. e., when the beam 9 divides equally between polarizing devices 7 and 8 which would ordinarily correspond to the null or zero position of the reflector 2 and would correspond to the zero position of the phasemeter 30 connected in the output of the phase detector 21. Corresponding electromotive forces $E_1$, $E_2$ and $E_R$ as applied to the phasemeter 30 are shown in the second column of Fig. 4. The signal voltage $E_s$ applied to the phasemeter is the voltage derived from the light beam resultant $L_t$ while $E_R$ is the reference voltage derived from the reference light from $L_R$.

Graph B of Fig. 4 shows values of $L_a$, $L_b$ and $L_t$ for a certain angular position of reflector 2 when more light is passing through polarizing device 8 than through polarizing device 7; while graph C shows these values for another position of reflector 2 when more light passes through polarizing device 7. Corresponding variations of $E_1$, $E_2$, $E_R$, $E_s$ are shown in the right-hand column of Fig. 4. The meter 30 may be a zero center meter so that turning movement of mirror 2 to the right or left of its null position will be correspondingly indicated by the meter 30. Thus, it will be seen that in operation the light beam is modulated in such a way that the phase of the modulation varies with the motion of the instrument 1 and this motion is detected, and the phase of the modulation is determined by the phasemeter 30. Thusly, the zero position of the meter 30 is dependent solely upon geometry of the system and is independent of the light source sensitivity and the sensitivity of the photo-cells 15 and 25.

In the form of the invention shown in Fig. 5, light from a light source 3' is formed into a beam by lens 14' and falls upon the signal mirror 2' carried as by the instrument 1'. The beam 9' is reflected from the mirror 2' and after passing through a rotating disc shutter or light chopper 32, falls upon an elliptical mirror 33 from which the light beam is reflected onto a photo-cell 34. Both the mirror 2' and the photo-cell 34 are located at foci of the elliptical mirror 33 so that over a suitable angle of motion of the signal mirror 2', the light beam will always fall on photo-cell 34. The rotating disc 32 comprises a plurality of mutually angularly spaced opaque sectors 35, 36, 37, etc., the said rotating disc being driven by the constant speed motor 38. As the mirror 2' turns in use, it swings the light beam 9 from side to side, the light beam when centered corresponding to the null position of shaft 1' by passing through disc 32 directly over its axis 39. Thus, the phase of the beam modulation varies with the turning of the signal reflector 2'.

Light from the lamp 3' is also focussed by a lens 24' into another beam whose position is fixed, passing below the axis 39 and falling upon a photo-cell 25'. The electrical outputs of photo-cells 34 and 25' are applied to a phase detector 21' similar to phase detector 21. The D. C. output of this phase detector serves to operate the phasemeter 30'.

Thus, as the signal mirror 2' turns through a small angle, the phase of the output from photo-cell 34 will shift relative to the output of photo-cell 25' and the resultant output at the terminals of the phase detector circuit 21' will correspondingly position the pointer of meter 30' to indicate the amount of turn of the shaft 1', the pointer of meter 30 swinging to the right or left depending upon the direction of turning of shaft 1'.

In this system, as in the previous system, the position of the signal mirror 1' for zero output is independent of the photo-cell sensitivities and the brightness of the lamp and is dependent solely upon the geometry of the system and the balance of the phase detector.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An angular motion detector and position indicator comprising a plurality of fixed light polarizing devices, a continuously rotating polarizing device, means directing a movable signal light beam and a fixed reference light beam for transmission through said fixed and rotating polarizing devices, said fixed and rotating polarizing devices effecting modulation of the intensity of the signal light beam and the reference light beam passing therethrough such that the phase of the modulation of the signal light beam with respect to the phase of the modulation of the reference light beam varies according to the motion of said movable signal light beam, photocell means for receiving said modulated signal and reference light beams, a phase detector connected to be responsive to the outputs of said photo-cell means, and a position indicator controlled from said phase detector for indicating the direction and extent of the motion of said movable signal light beam.

2. An angular motion detector and position indicator comprising a plurality of fixed light polarizing devices and a continuously rotating polarizing device, means for passing a fixed reference light beam and a movable signal light beam through said fixed and rotating polarizing devices, photo-cell means for receiving said light beams, said fixed and roating polarizing devices effecting the modulation of said light beams, the phase of the modulation of said movable signal light beam with respect to the phase of the modulation of said fixed reference light beam varying progressively with the motion to be detected, phase detector means connected to be responsive to said photo-cell means, filters included in the connection to said phase detector means for passing the fundamental outputs of said photo-cell means, and a positional indicator controlled from said phase detector means.

3. An angular motion detector and indicator comprising a pair of fixed light polarizing devices arranged side by side, the plane of polarization of one polarizing device oriented obliquely with respect to the plane of polarization of the other polarizing device, means for sweeping a signal light beam across said polarizing devices in response to the angular motion to be detected, a rotating polarizing device for receiving said signal light beam after transmission through said fixed polarizing devices, photo-cell means for receiving said signal light beam after the same leaves said polarizing device, means supplying a fixed phase reference voltage, said photo-cell means having an output voltage variable in phase with respect to said fixed phase reference voltage with changes in the angular motion to be detected, a phase detector fed from said photo-cell means and an angular indicator for indicating the extent and direction of the angular motion controlled from said phase detector.

4. The angular motion detector and indicator as defined in claim 3 wherein the plane of polarization of the signal light beam emerging from one of said polarizing devices is disposed at an angle of substantially 45 degrees with respect to the plane of polarization of the signal light beam when emerging from said other fixed polarizing device.

5. An angular motion detector and position indicator, comprising in combination, means providing a beam of light, means including a rotating device through which said beam of light is transmitted, said means including said rotating device varying the intensity of the beam of light passing therethrough according to the rotational position of said rotating device, means changing the direction of said beam of light passing through said means including said rotating device in accordance with the motion to be detected, means responsive to changes in the intensity of the emerging light beam for producing an alternating output signal voltage, means providing a reference alternating voltage whose frequency is the same as the frequency of said alternating output signal voltage, said alternating signal voltage from said light responsive means varying in phase relative to the phase of said alternating reference voltage according to the changes in the direction of said light beam passing through said means including said rotating device, phase comparison means responsive to said alternating signal voltage and to said alternating reference voltage, and indicator means coupled to said phase comparison means for indicating the phase difference between said signal and reference voltages.

6. The apparatus as defined in claim 5 wherein said means including said rotating device through which said beam of light is transmitted, comprises a pair of fixed light polarizing devices disposed adjacent to each other, the plane of polarization of one of said polarizing devices oriented obliquely with respect to the plane of polarization of said other polarizing device, and wherein said rotating device comprises a further polarizing means.

7. An angular position indicator comprising, a pair of polarizing devices arranged side by side and disposed with their planes of polarization at an angle substantially of 45° with respect to each other, means for moving a light beam across said polarizing devices in response to the turning of a member, a rotating polarizing device positioned for receiving the light beam after traversing said pair of polarizing devices and a photo-cell positioned for receiving said light beam after traversing said rotating polarizing device.

8. An angular position indicator comprising, a pair of polarizing devices arranged side by side and with their planes of polarization at an angle substantially of 45° with respect to each other, means for moving a light beam across said polarizing devices in response to the turning of a member, a rotating polarizing device positioned for receiving the light beam after traversing said pair of polarizing devices, a photo-cell positioned for receiving said light beam after traversing said rotating polarizing device, a source of reference voltage, and a phase detector circuit supplied from said photo-cell output and with said reference voltage.

9. An angular position indicator comprising a pair of polarizing devices arranged side by side, the plane of polarization of one polarizing device being oriented obliquely with respect to the plane of polarization of the other polarizing device, means for sweeping a light beam across said polarizing devices in response to angular movement, a rotating polarizing device for receiving said light beam after transmission through said pair of polarizing devices, photocell means for receiving said light beam after the same leaves said rotating polarizing device, a phase detector fed from said photo-cell means and an angular indicator for indicating the extent and direction of the angular movement controlled from said phase detector.

10. An angular position indicator comprising a pair of fixed polarizing devices arranged side by side, the plane of polarization of one polarizing device being oriented obliquely with respect to the plane of polarization of the other polarizing device, a reference polarizing device, means for sweeping a light beam over said pair of polarizing devices in response to angular movements, means supplying a light beam to said reference polarizing device, a rotating polarizing device for receiving said light beams after traversing said fixed and reference polarizing devices, photo-cell means for receiving said light beams upon leaving said rotating polarizing device, a phase detector controlled from said photo-cell means and an angular indicator controlled from said phase detector means.

11. In an angular position indicator, a turnable member, a photo-cell pick-off comprising a pair of polarizing devices arranged side by side, the plane of polarization of one polarizing device being oriented obliquely with respect to the plane of polarization of the other polarizing device, means for moving a light beam across said polarizing devices in response to the turning of said member, a rotating polarizing device positioned for receiving the light beam after traversing said pair of polarizing devices, and a photo-cell positioned for receiving said light beam after traversing said rotating polarizing device.

12. In an angular position indicator, a turnable member, a photo-cell pick-off comprising a pair of polarizing devices arranged side by side, the plane of polarization of one polarizing device being oriented obliquely with respect to the plane of polarization of the other polarizing device, means for moving a light beam across said polarizing devices in response to the turning of said member, a rotating polarizing device positioned for receiving the light beam after traversing said pair of polarizing devices, a photo-cell positioned for receiving said light beam after traversing said rotating polarizing device, a source of reference voltage, and a phase detector circuit supplied from said photo-cell output and with said reference voltage.

13. An angular position indicator responsive to the angular movement of a sensitive member comprising a pair of polarizing devices arranged side by side, the plane of polarization of one polarizing device being oriented obliquely with respect to the plane of polarization of the other polarizing device, a light source, a reflector carried by said sensitive member for deflecting light from said light source across said polarizing devices, the movement of said light beam over said polarizing devices being responsive to the angular turning of said member, a fixed polarizing device for receiving light from said source, a rotating polarization device positioned for receiving light passing through said pair of polarizing devices and said fixed polarizing device, a photo-cell for receiving light passing through said pair of polarizing devices and said rotating polarizing device, a second photo-cell for receiving light passing through said fixed polarizing device and said rotating polarizing device, a phase detector circuit, means for supplying the outputs of said photo-cells to said phase detector circuit, and an angular position indicator connected in the output of said phase detector circuit.

14. In an angular position indicator, an angularly turnable member, a photo-cell, polarizing means positioned between said member and said photo-cell, a light source providing a light beam responsive to angular turning movements of said member and passing through said polarizing means and on to said photo-cell for rendering the latter responsive to angular movement of said member, a phase detector circuit having push-pull rectifiers connected to be supplied from the output of said photo-cell, means connected for supplying a reference voltage to said phase detector circuit, an angular position indicator connected to the output of said phase detector circuit for indicating the angular position of said member, the operation of said phase detector being unaffected by variations in the sensitivity of said photo-cell, said reference voltage supplying means comprising a second photo-cell arranged to be illuminated by said light source, and additional polarizing means located between said light source and said second photo-cell, the output of said second photo-cell being connected in like phase to said push-pull rectifiers.

WINSLOW PALMER.

References Cited in the file of this patent

UNITED STATES PATENTS

| Number | Name | Date |
|---|---|---|
| 1,931,352 | Reichel et al. | Oct. 24, 1933 |
| 2,167,484 | Berry | July 25, 1939 |
| 2,227,147 | Lindsay | Dec. 31, 1940 |
| 2,309,117 | John | Jan. 26, 1943 |
| 2,358,103 | Ryder | Sept. 12, 1944 |
| 2,402,719 | Allison | June 25, 1946 |
| 2,420,013 | Rajchman | May 6, 1947 |
| 2,420,509 | Whittaker | May 13, 1947 |
| 2,503,023 | Berry | Apr. 4, 1950 |